United States Patent
Datta

(10) Patent No.: US 9,073,465 B2
(45) Date of Patent: Jul. 7, 2015

(54) REMOVABLE AND STOWABLE HEAD RESTRAINT

(71) Applicant: GM GLOBAL TECHNOLOGY OPERATIONS LLC, Detroit, MI (US)

(72) Inventor: Samir Datta, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 13/858,151

(22) Filed: Apr. 8, 2013

(65) Prior Publication Data

US 2014/0300167 A1 Oct. 9, 2014

(51) Int. Cl.
*B60N 2/02* (2006.01)
*B60N 2/48* (2006.01)
*B60N 2/20* (2006.01)

(52) U.S. Cl.
CPC ............. *B60N 2/487* (2013.01); *B60N 2/206* (2013.01); *B60N 2/4879* (2013.01)

(58) Field of Classification Search
USPC .............. 297/403, 400, 397, 401, 378.1
See application file for complete search history.

(56) References Cited

U.S. PATENT DOCUMENTS

| | | | | |
|---|---|---|---|---|
| 2,098,743 A * | 11/1937 | Ericson | ............... | 297/403 |
| 2,865,434 A * | 12/1958 | Grenz | ............... | 297/403 |
| 2,874,757 A * | 2/1959 | Requa | ............... | 297/400 |
| 3,046,057 A * | 7/1962 | Smetko | ............... | 297/397 |
| 3,195,953 A * | 7/1965 | Zacks | ............... | 297/397 |
| 3,226,159 A * | 12/1965 | Binding | ............... | 297/397 |
| 3,449,012 A * | 6/1969 | Georges | ............... | 297/403 |
| 4,042,278 A * | 8/1977 | Jensen | ............... | 297/397 |
| 4,206,945 A * | 6/1980 | Kifferstein | ............... | 297/397 |
| 5,273,342 A * | 12/1993 | Pratt | ............... | 297/397 |
| 5,315,726 A * | 5/1994 | Borenstein | ............... | 297/397 |
| 5,501,508 A * | 3/1996 | Llewellyn | ............... | 297/397 |
| 5,800,019 A * | 9/1998 | Knightlinger | ............... | 297/397 |
| 6,010,192 A * | 1/2000 | King | ............... | 297/397 |
| 6,113,192 A * | 9/2000 | Schneider | ............... | 297/403 |
| 6,484,335 B2 * | 11/2002 | Gilbert | ............... | 297/397 |
| 6,669,300 B1 * | 12/2003 | Lee | ............... | 297/397 |
| 6,951,367 B1 * | 10/2005 | Dinnan | ............... | 297/397 |
| 7,108,323 B2 * | 9/2006 | Welch et al. | ............... | 297/378.1 |
| 7,901,005 B2 * | 3/2011 | Khan et al. | ............... | 297/378.1 |
| 2011/0133535 A1 * | 6/2011 | Jeong et al. | ............... | 297/378.1 |

* cited by examiner

*Primary Examiner* — Jose V Chen
(74) *Attorney, Agent, or Firm* — Quinn Law Group, PLLC

(57) ABSTRACT

A seat assembly for a motor vehicle is provided. The seat assembly includes a seat back portion and a removable and stowable head restraint. The seat back portion has a first surface and is configured to occupy one of an upright seating position and a folded cargo position. The head restraint is configured to be coupled to the first surface of the seat back portion. The head restraint is configured to occupy one of a deployed position and a stowed position. The head restraint remains secured to the seat back portion in each of the deployed position and the stowed position. Specifically, the head restraint occupies the stowed position when the seat back portion occupies the folded cargo position.

19 Claims, 3 Drawing Sheets

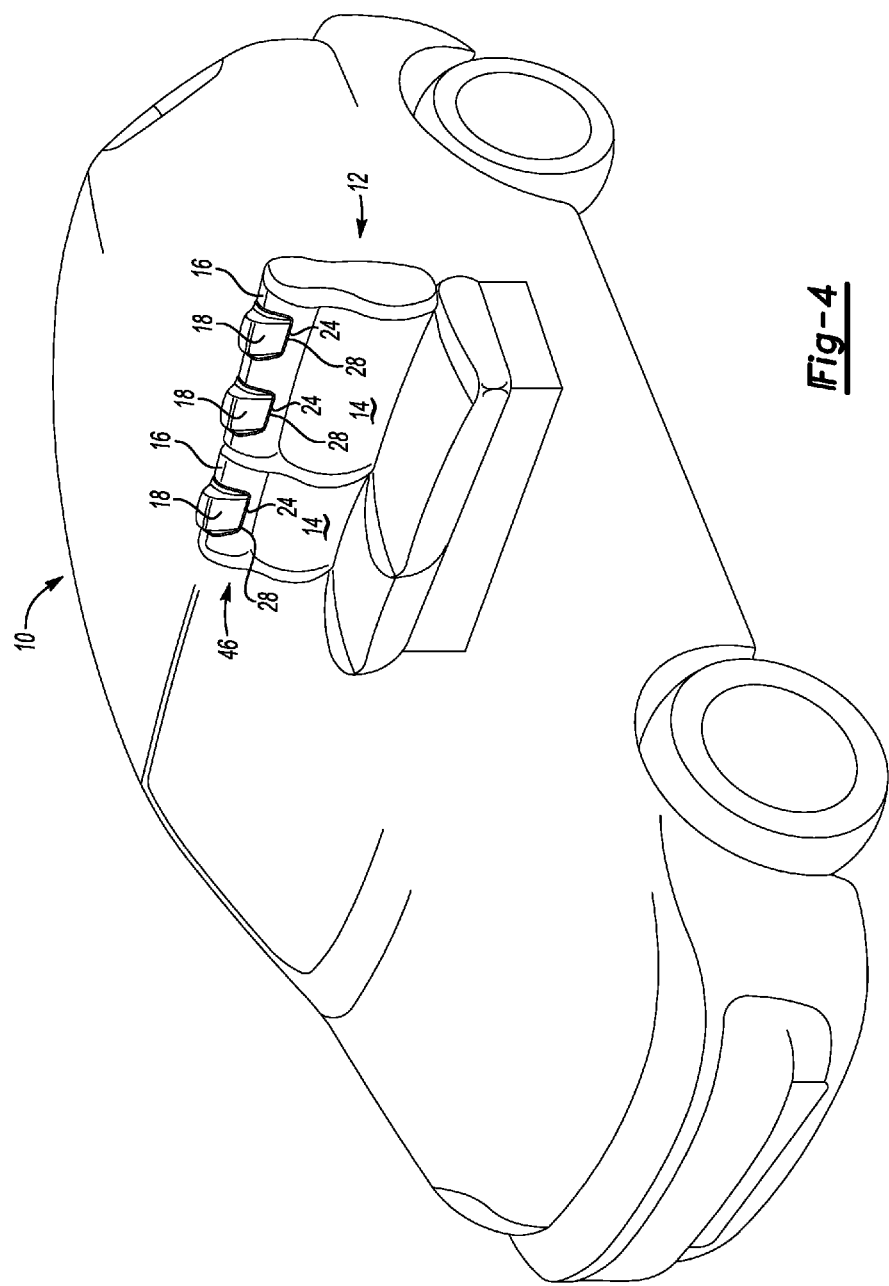

REMOVABLE AND STOWABLE HEAD RESTRAINT

TECHNICAL FIELD

The disclosure relates to a seat assembly for a motor vehicle comprising a removable and stowable head restraint.

BACKGROUND

A head restraint for a vehicle interior seat may be a fixed integrated head restraint design or an adjustable and removable head restraint design. A fixed integrated head restraint is formed integrally with the vehicle seat back as a portion thereof. An integrated head restraint is neither removable nor adjustable.

An adjustable and removable head restraint design generally includes two metal guide rods with serrations thereon, which are respectively coupled with two sleeves located along the top surface of the vehicle seat back. Such a design allows for various height positions at regular intervals defined by the serrations formed upon each of the respective guide rods.

SUMMARY

A seat assembly for a motor vehicle is provided. The seat assembly includes a seat back portion and a removable and stowable head restraint. The seat back portion has a first surface and is configured to occupy one of an upright seating position and a folded cargo position.

The head restraint is configured to be coupled with the first surface of the seat back portion. The head restraint is attached to the seat back portion at a first attachment point with a first attachment feature and at a second attachment point with a second attachment feature.

The head restraint is configured to occupy one of a deployed position and a stowed position. The head restraint remains secured to the seat back portion in each of the deployed position and the stowed position. Specifically, the head restraint occupies the stowed position when the seat back portion occupies the folded cargo position.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 4 is a fragmentary perspective view of the vehicle interior with the seat back portion of the vehicle seat in an upright seating position and the head restraint in a deployed position.

DETAILED DESCRIPTION

Referring to the Figures, wherein like reference numbers correspond to like or similar components throughout the several views, a seat assembly 12 for a motor vehicle 10 is provided. The seat assembly 12 generally comprises a seat back portion 14 and a removable and stowable head restraint 18, shown generally in FIGS. 1 and 2.

Figure 1:
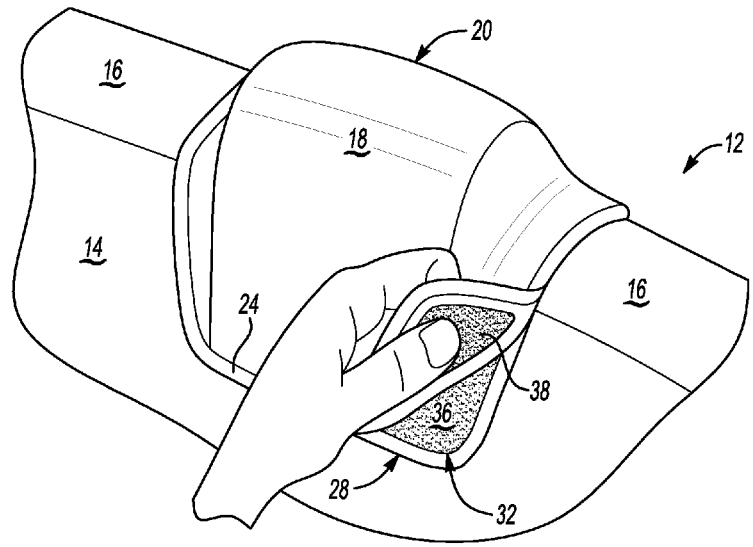
FIG. 1 is a fragmentary perspective view of the seat assembly with the head restraint in a deployed position.
Figure 2:
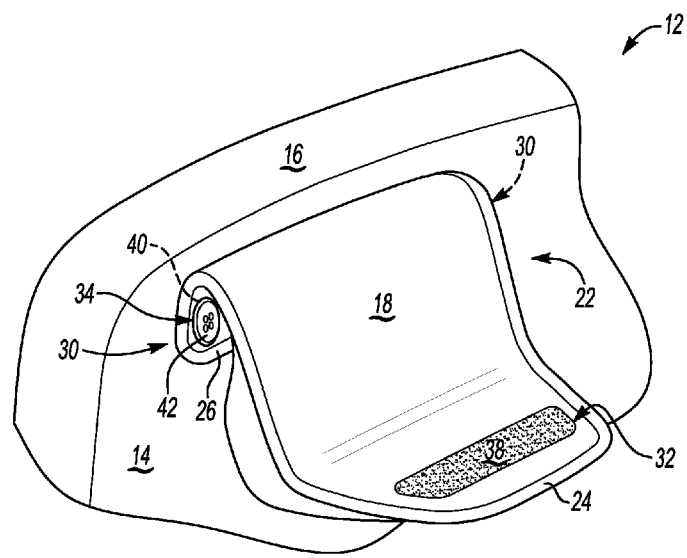
FIG. 2 is a fragmentary perspective view of the seat assembly with the head restraint in a stowed position.

Referring to FIGS. 1 and 2, the seat back portion 14 has a first surface 16, a second surface, and a third surface. The first surface 16 may be a distal surface of the seat back portion 14 disposed between the second surface and the third surface. The head restraint 18 is configured to be coupled with the first surface 16 of the seat back portion 14.

The head restraint 18 may have a first edge 24 and a second edge 26. The first edge 24 may be configured to attach to the second surface of the seat back portion 14 at a first attachment point 28. The second edge 26 may be configured to attach the head restraint 18 to the third surface of the seat back portion 14 at a second attachment point 30.

The head restraint 18 is configured to be coupled to the second surface of the seat back portion 14 at the first attachment point 28 via a first attachment feature 32. The first attachment feature 32 may have a first portion 36 and a second portion 38. The first portion 36 is configured to be coupled with the second surface of the vehicle seat back portion 14 and the second portion 38 is configured to be coupled with the first edge 24 of the head restraint 18.

The first attachment feature 32 may be any two-part attachment feature. The first attachment feature 32 may be a fabric hook and loop fastener, a removable button engagement, or another suitable attachment and detachment medium. For example, the first portion 36 may be composed of one of fabric hooks and fabric loops and the second portion 38 may be composed of one of fabric hooks and fabric loops, such that the first portion 36 and second portion 38 may form an interlocking engagement to secure the head restraint 18 to the seat back portion 14 at the first attachment point 28.

Referring specifically to FIG. 2, the head restraint 18 may be coupled to the third surface of the seat back portion 14 at the second attachment point 30 via a second attachment feature 34. The second attachment feature 34 may have a first portion 40 and a second portion 42. The first portion 40 may be coupled with the second edge 26 of the head restraint 18. The second portion 42 may be coupled with the third surface of the seat back portion 14.

The second attachment feature 34 may be any two-part attachment feature. The second attachment feature 34 may be a fabric hook and loop fastener, a removable button engagement, or another suitable attachment and detachment medium. For example, the first portion 40 may be a plurality of button holes defined by the second edge 26 of the head restraint 18. The second portion 42 may be a plurality of buttons coupled with the seat back portion 14. The first portion 40 and the second portion 42 may form an interlocking engagement to secure the head restraint 18 to the seat back portion 14 at the second attachment point 30.

While designed to appear integral with the seat back portion 14, the head restraint 18 is fully removable or detachable and stowable. As such, the head restraint 18 may be fully removed from the seat back portion 14 by detaching the second portion 38 of the first attachment feature 32 from the first portion 36 of the first attachment feature 32 and detaching the first portion 40 of the second attachment feature 34 from the second portion 42 of the second attachment feature 34. This allows for the headrest 18 to be cleaned independently from the vehicle interior. Allowing the full detachment or removal of the head restraint 18 from the seat back portion 14 also allows for a single tooling and fabric design across a variety of vehicle 10 makes and models. For example, the head restraint 18 may be integrated as a high-variant option while the form and tooling of the interior vehicle seat remains standard across a variety of vehicle 10 variants. The full detachment or removal of the head restraint 18 from the seat back portion 14 further allows the head restraint 18 to be sold separately as an accessory for vehicle 10 variants that may not come standard with such an option.

Figure 3:
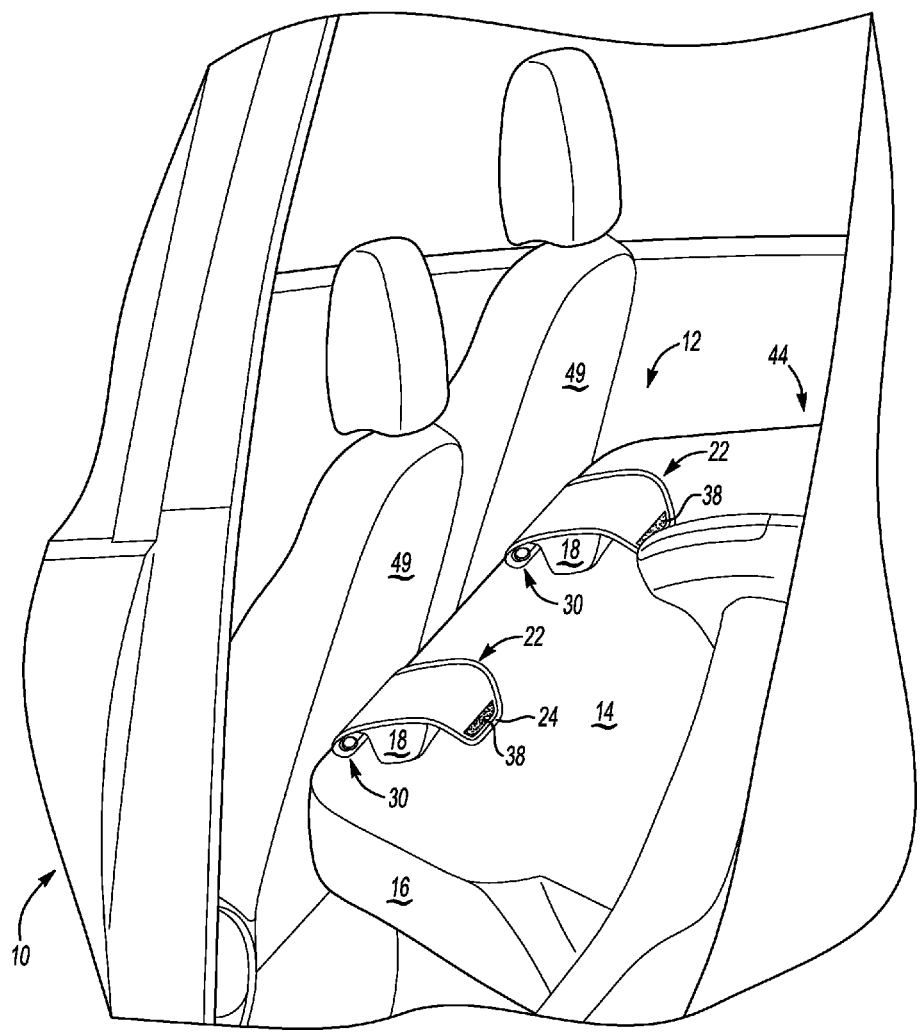
FIG. 3 is a fragmentary perspective view of the vehicle interior with the seat back portion of the rear vehicle seat in a folded cargo position and the head restraint in the stowed position.

When coupled with the seat back portion 14, the head restraint 18 is configured to occupy one of a deployed position 20 (shown in FIGS. 1 and 4) and a stowed position 22 (shown in FIGS. 2 and 3). In each of the deployed position 20 and the stowed position 22 the head restraint 18 remains secured to the seat back portion 14. In the deployed position 20, the head restraint 18 is secured to the seat back portion 14 at each of the first attachment point 28 and the second attachment point 30. In the stowed position 22, the head restraint 18 is secured to the seat back portion 14 at the second attachment point 30 and is folded back and pivoted about the second attachment point 30.

Referring to FIGS. 3 and 4, the seat back portion 14 may be a seat back portion 14 of an interior vehicle seat which may be a rear bench-type or split-type seat, as shown in FIGS. 3 and 4. The seat back portion 14 is configured to occupy one of a folded cargo position 44 (shown in FIG. 3) and an upright seating position 46 (shown in FIG. 4). When the seat back portion 14 occupies the folded cargo position 44, the head restraint 18 occupies the stowed position 22, allowing the leg space available to passengers in the front vehicle seats 49 to remain unchanged or increased, as the stowed position 22 of the head restraint 18 eliminates the need to compensate for a fixed or integral head restraint when moving the seat back portion 14 to the folded cargo position 44.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A seat assembly for a motor vehicle comprising:
    a seat back portion having a first surface, a second surface, and a third surface, such that the first surface is a distal surface of the seat back portion disposed between the second surface and the third surface;
    a head restraint configured to be selectively coupled to the seat back portion, wherein the head restraint has a first edge and a second edge, such that the first edge is attachable to the second surface of the seat back portion at a first attachment point with a first attachment feature and the second edge is attachable to the third surface of the seat back portion at a second attachment point with a second attachment feature;
    wherein the head restraint is further configured to occupy one of a deployed position and a stowed position when the head restraint is coupled to the seat back portion; and
    wherein when the head restraint occupies the deployed position the head restraint is disposed upon the first surface of the seat back portion, the first edge is directly attached to and in contact the second surface of the seat back portion via the first attachment feature at the first attachment point, and the second edge is directly attached to and in contact with the third surface of the seat back portion via the second attachment feature at the second attachment point.

2. The seat assembly of claim 1 wherein the head restraint is further configured to be removable from the seat back portion.

3. The seat assembly of claim 1 wherein the first attachment feature has a first portion and a second portion, the first portion attached to the second surface of the seat back portion and the second portion attached to the first edge of the head restraint.

4. The seat assembly of claim 3 wherein the first attachment feature is a hook and loop fastener made of fabric, and wherein the first portion is composed of one of fabric hooks and fabric loops and the second portion is composed of one of fabric hooks and fabric loops.

5. The seat assembly of claim 3 wherein the second edge of the head restraint is attached to the third surface of the seat back portion at the second attachment point with the second attachment feature in each of the deployed position and the stowed position.

6. The seat assembly of claim 5 wherein the second attachment feature has a first portion associated with the head restraint second edge and a second portion coupled to the third surface of the seat back portion.

7. The seat assembly of claim 6 wherein the first portion is a plurality of button holes defined by the second edge of the head restraint and wherein the second portion is a plurality of buttons coupled with the third surface of the seat back portion at the second attachment point.

8. The seat assembly of claim 6 wherein the seat back portion is configured to occupy one of an upright seating position and a folded cargo position.

9. The seat assembly of claim 8 wherein the head restraint occupies the stowed position when the vehicle seat back portion occupies the folded cargo position.

10. A vehicle comprising:
    at least one interior vehicle seat having a seat back portion, the seat back portion having a first surface, a second surface, and a third surface, such that the first surface is a top distal surface of the seat back portion disposed between the second surface and the third surface, wherein the seat back portion is pivotable between an upright seating position and a folded cargo position;
    a head restraint having a first edge and a second edge, the head restraint configured to occupy one of a deployed position and a stowed position, wherein the first edge directly attaches to and is placed in contact with the second surface of the seat back portion at a first attachment point with a first attachment feature in the deployed position and the second edge directly attaches to and is placed in contact with the third surface of the seat back portion at a second attachment point with a second attachment feature in each of the deployed position and the stowed position; and
    wherein the head restraint occupies the stowed position when the vehicle seat back portion occupies the folded cargo position.

11. The vehicle of claim 10 wherein the head restraint is removable from the seat back portion.

12. The vehicle of claim 10 wherein the first attachment feature has a first portion and a second portion, the first portion coupled with the second surface of the seat back portion of the at least one interior vehicle seat and the second portion coupled with the first edge of the head restraint.

13. The vehicle of claim 12 wherein the first attachment feature is a hook and loop fastener made of fabric, and wherein the first portion is composed of one of fabric hooks and fabric loops and the second portion is composed of one of fabric hooks and fabric loops.

14. The vehicle of claim 12 wherein the second attachment feature has a first portion associated with the head restraint second edge and a second portion coupled with the third surface of the seat back portion of the at least one interior vehicle seat.

15. The vehicle of claim 14 wherein the first portion of the second attachment feature is a plurality of button holes defined by the second edge of the head restraint and wherein the second portion of the second attachment feature is a plurality of buttons coupled to the seat back portion at the second attachment point.

16. A seat assembly for a motor vehicle comprising:
- a seat back portion having a first surface, a second surface, and a third surface, such that the first surface is a top distal surface of the seat back portion disposed between the second surface and the third surface, wherein the seat back portion is configured to occupy one of an upright seating position and a folded cargo position;
- a head restraint selectively coupled to the seat back portion, the head restraint occupying one of a deployed position and a stowed position, such that in the deployed position the head restraint is coupled to the first surface of the seat back portion, wherein the head restraint includes:
  - a first edge attachable to the second surface of the seat back portion at a first attachment point with a first attachment feature, the first attachment feature having a first portion coupled to the second surface of the seat back portion and the second portion coupled to the first edge of the head restraint;
  - a second edge attachable to the third surface of the seat back portion at a second attachment point with a second attachment feature, the second attachment feature having a first portion associated with the second edge of the head restraint and a second portion coupled with the third surface of the seat back portion;
- wherein the first edge directly attaches to and is placed in contact with the second surface of the seat back portion by coupling the first portion of the first attachment feature and the second portion of the first attachment feature at the first attachment point when the head restraint occupies the deployed position and the second edge directly attaches to and is placed in contact with the third surface of the seat back portion by coupling the first portion of the second attachment feature and the second portion of the second attachment feature at the second attachment point when the head restrain occupies each of the deployed position and the stowed position; and
- wherein the head restraint occupies the stowed position when the vehicle seat back portion occupies the folded cargo position.

17. The seat assembly of claim 16 wherein the first attachment feature is a hook and loop fastener made of fabric, and wherein the first portion is composed of one of fabric hooks and fabric loops and the second portion is composed of one of fabric hooks and fabric loops.

18. The seat assembly of claim 16 wherein the second attachment feature is button attachment, wherein the first portion is a plurality of button holes defined by the second edge of the head restraint and wherein the second portion is a plurality of buttons coupled to the seat back portion at the second attachment point.

19. The seat assembly of claim 9 wherein the head restraint occupies the stowed position, such that the head restraint is directly attached to and in contact with the third surface of the seat back portion via the second attachment feature at the second attachment point and the head restraint is detached from the second surface of the seat back portion, such that the first portion of the first attachment feature is decoupled from the second portion of the first attachment feature.

* * * * *